United States Patent
Kawai

(10) Patent No.: US 7,027,192 B2
(45) Date of Patent: Apr. 11, 2006

(54) DATA COMMUNICATION APPARATUS

(75) Inventor: Shinichi Kawai, Utsunomiya (JP)

(73) Assignee: Panasonic Communications Co., Ltd., Fukuoka (JP)

(*) Notice: Subject to any disclaimer, the term of this patent is extended or adjusted under 35 U.S.C. 154(b) by 837 days.

(21) Appl. No.: 09/964,748

(22) Filed: Sep. 28, 2001

(65) Prior Publication Data
US 2002/0118396 A1 Aug. 29, 2002

(30) Foreign Application Priority Data
Feb. 28, 2001 (JP) .............................. 2001-055007

(51) Int. Cl.
*H04N 1/00* (2006.01)
(52) U.S. Cl. ............ 358/402; 358/402; 358/1.15; 358/440; 379/93.23; 379/93.24; 379/100.08; 345/1.1; 707/6
(58) Field of Classification Search ............ 358/402, 358/1.6, 1.15, 1.9, 440; 370/490; 379/93.23, 379/93.24, 100.08; 345/1.1; 707/6; 710/62
See application file for complete search history.

(56) References Cited

U.S. PATENT DOCUMENTS

| | | | | |
|---|---|---|---|---|
| 5,812,278 A | * | 9/1998 | Toyoda et al. | 358/402 |
| 6,028,982 A | * | 2/2000 | Toyoda et al. | 358/1.15 |
| 6,167,469 A | * | 12/2000 | Safai et al. | 710/62 |
| 6,545,768 B1 | * | 4/2003 | Matsubara et al. | 358/1.15 |
| 6,801,546 B1 | * | 10/2004 | Yoshida et al. | 370/490 |
| 6,813,036 B1 | * | 11/2004 | Matsushita | 358/1.15 |
| 6,829,607 B1 | * | 12/2004 | Tafoya et al. | 707/6 |
| 2001/0028469 A1 | * | 10/2001 | Ooi et al. | 358/1.9 |

FOREIGN PATENT DOCUMENTS

| | | | |
|---|---|---|---|
| JP | 10-322508 | * | 12/1998 |
| JP | 2000134402 | | 5/2000 |
| JP | 2001-051922 | * | 2/2001 |

OTHER PUBLICATIONS

English Language Abstract of JP 2000-134402.

* cited by examiner

*Primary Examiner*—Mark Wallerson
*Assistant Examiner*—Beniyam Menberu
(74) *Attorney, Agent, or Firm*—Greenblum & Bernstein, P.L.C.

(57) ABSTRACT

When characters are input, the input information is sequentially displayed on a first display, an e-mail address, which is registered in a one-touch key registration area, is retrieved by using the input information, and the retrieved e-mail address is displayed on a second display. Further, when an @ mark is input after a character string input, the information displayed on the second display is switched to a domain name read from the domain name registration area. Thus, the @ mark key, which is always used to input e-mail addresses, is also utilized to switch the display information. Accordingly, the data communication apparatus is capable to prevent the inconvenience of inputting the entire e-mail addresses and to prevent input errors.

7 Claims, 10 Drawing Sheets

| | | | 401 | |
|---|---|---|---|---|
| A | B | C | D | E |
| 1  F | 2  G | 3  H | 4  I | 5  J |
| 6  K | 7  L | 8  M | 9  N | 10 O |
| 11 P | 12 Q | 13 R | 14 S | 15 T |
| 16 U | 17 V | 18 W | 19 X | 20 Y |
| P1 Z | P2 @ | P3 SPACE | P4 SYMBOLS | P5 |

402  403  404

DATA COMMUNICATION APPARATUS

BACKGROUND OF THE INVENTION

1. Field of the Invention

This invention relates to a data communication apparatus, exemplified by an image communication apparatus that has a function to designate a destination by an e-mail address and transmit an image via internet.

2. Description of Related Art

Recently, image communication apparatuses are introduced, with a function that can perform facsimile communication via internet in addition to via public phone line.

Conventionally, for such image communication apparatus, it is necessary to input an e-mail address for designating a designation when the facsimile communication is performed via internet. Such e-mail addresses, for example, 'HYPERLINK"mailto:abc@def.panasonic.co.jp"abc@def.panasonic.co.jp', consist of an "at mark" (@), a "username" (abc) preceding the @, and a "domain name" (def.panasonic.co.jp) succeeding the @. As for domain names, a "co-domain name", used for a regular company, is usually assigned to each company. A user name is assigned to each individual who belongs to the company.

Such e-mail addresses are different from phone numbers that are made merely with numbers; they usually include extensive strings of combinations of alphabets, numbers, and symbols such as "- (hyphen)". Therefore, it is very complicated to input the same and is easy to make input errors with.

Especially, image communication apparatus with a function to transmit images via internet using an e-mail address to designate a destination on a facsimile apparatus, usually do not have as enough space for each alphabet key as in computer keyboards, but rather use numeric keys for numeric input or an input panel for one-touch key input to input alphabets. Consequently, inputting alphabets tends to become even more complicated.

A conventional art to simplify e-mail address input suggests to pre-register frequently used domain names in a memory, so that upon inputting e-mail addresses operators can only input user names, and select one of the registered domain names (Japanese Laid-Open Application 2000-134402, hereinafter described as the prior art).

However, the art mentioned in the prior art above had the following problems.

Even though it was possible to reduce input errors of domain names by omitting the domain name input, user names still contain many alphabets and the character strings are often extensive. Thus, even with the prior art, it was still complicated to input entire e-mail addresses, and it was easy to make errors during the input of the same. Similar problems existed upon registering e-mail addresses as destinations in one-touch key and speed dial systems.

Such problems were common not only to the above-described image communication apparatus, but also to mobile information terminals including mobile phones with a function to transmit character strings, such as e-mail addresses as destinations, via internet.

This invention is provided in view of the above-described problems. The object of the present invention is to provide a data communication apparatus that can eliminate the inconvenience of inputting entire e-mail addresses, and prevent input errors.

SUMMARY OF THE INVENTION

To solve the problem, the data communication apparatus in the present invention is provided with a first input section that inputs at least a character string, a second input section that inputs an @ mark, a first registration section that pre-registers a destination, a second registration section that pre-registers a domain name, a display section that displays input information input by the first and second input sections, a retrieving section that retrieves a destination from the first registration section using the character string input by the first input section, and a controller that simultaneously displays the input information and the destination retrieved by the retrieving section on a display section, and, when an @ mark is input, displays a domain name read from the second registration section on the display section.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIG. 4 is a plan view illustrating a multifunctional input panel of the image communication apparatus according to the above-described embodiment;

DETAILED DESCRIPTION OF PREFERRED EMBODIMENT

Figure 1:
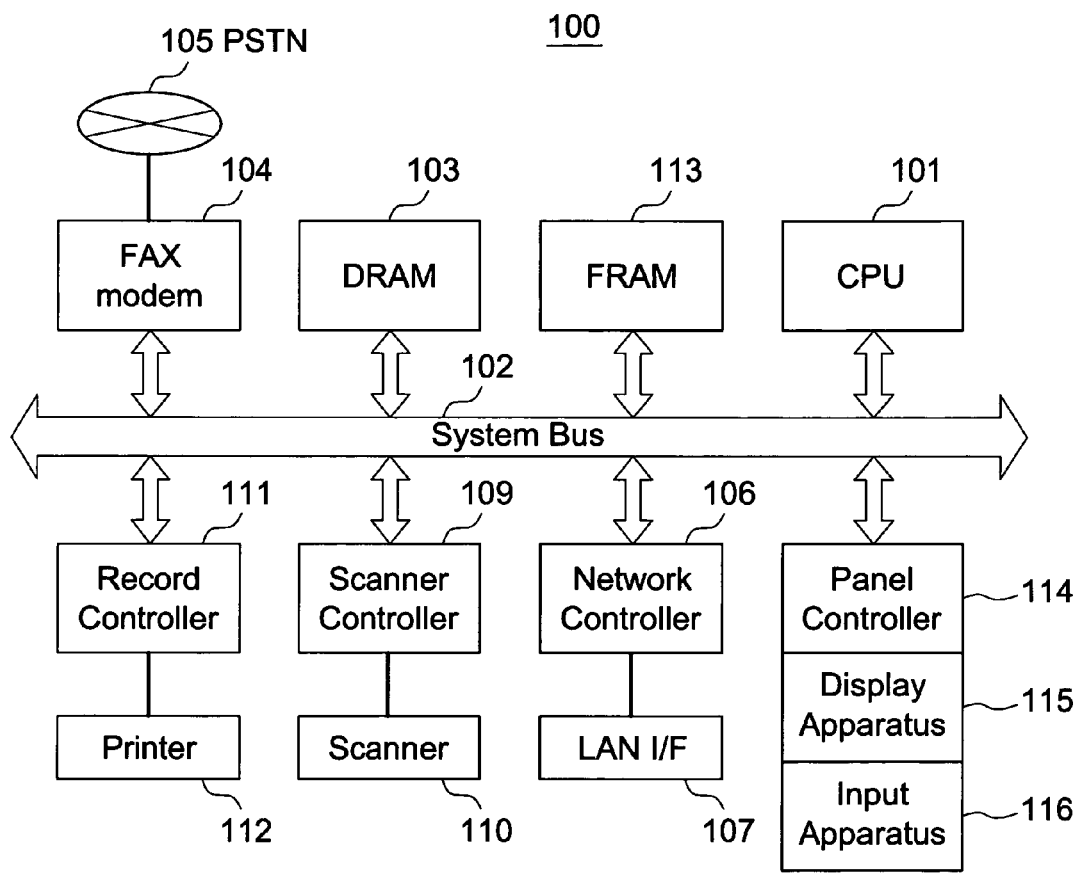
FIG. 1 is a block diagram illustrating hardware configuration of an image communication apparatus according to the embodiment of the present invention.

An image communication apparatus according to an embodiment of the present invention is explained in the following. FIG. 1 is a block diagram illustrating hardware configuration of the image communication apparatus according to the embodiment of the present invention. A CPU 101 is a processing apparatus that controls each element of the image communication apparatus 100, and it is connected to each element, which is described later, to control the element via a system bus 102. A DRAM 103 is a memory that provides a work area, or the like, for the CPU 101. A FAX modem 104 executes facsimile processes and transmits/receives image information via a PSTN 105. A network controller 106 controls a LAN interface 107 and transmits/receives image information in an e-mail format via internet, using e.g., an e-mail transmission protocol. A scanner controller 109 controls a scanner 110 and obtains image information by scanning a paper document. A record controller 111 controls a printer 112 and prints out the image information obtained from the FAX modem 104, the network controller 106, or the scanner controller 109.

Figure 2:
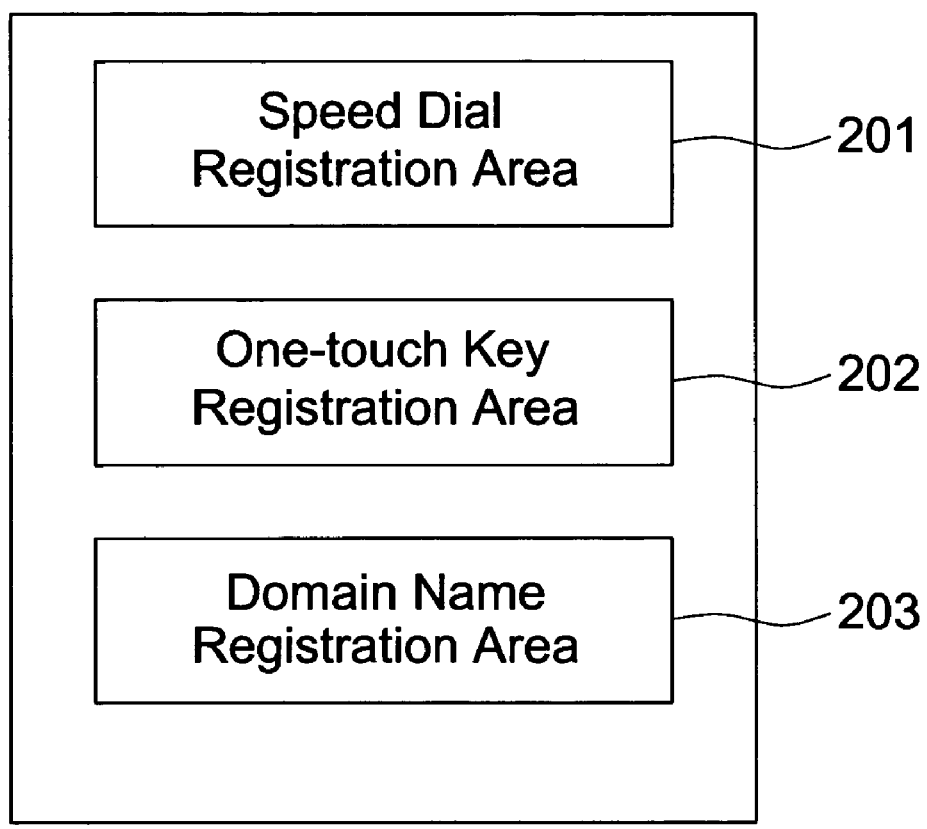
FIG. 2 shows a flash memory configuration of the image communication apparatus according to the above-described embodiment.

In addition, a flash memory (FRAM) 113 as a non-volatile memory includes a speed dial registration area 201, a one-touch key registration area 202, and a domain name registration area 203, as shown in FIG. 2.

Furthermore, a panel controller 114 controls a display apparatus 115 and an input apparatus 116, and provides a variety of information to an operator for operating the image communication apparatus 100.

Figure 3:
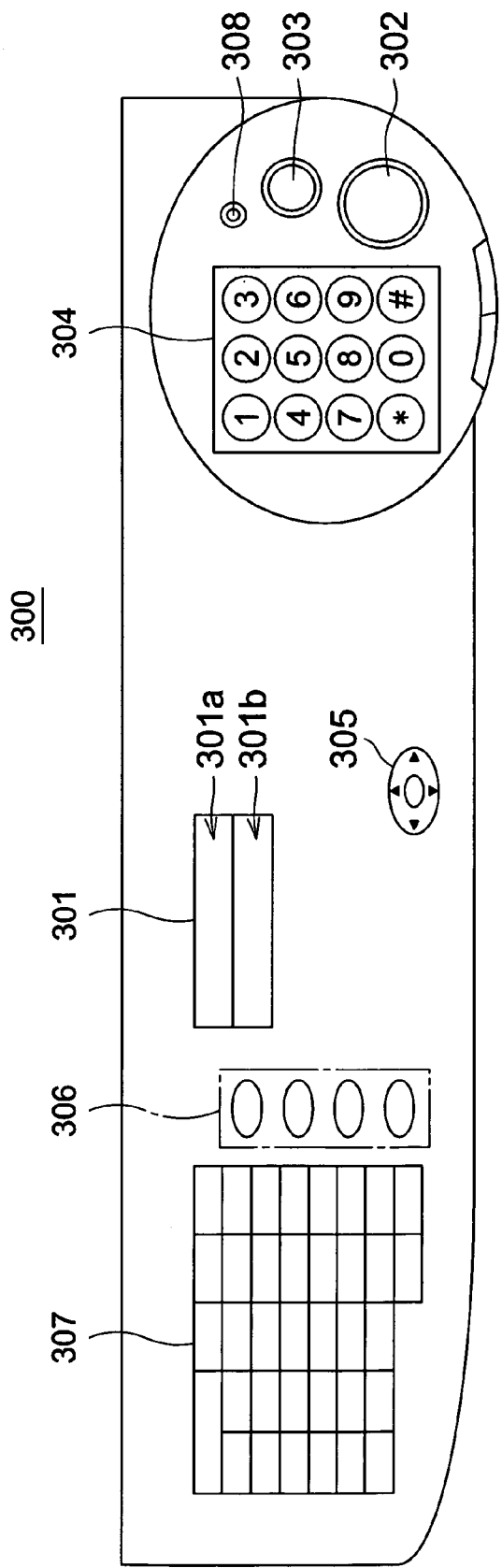
FIG. 3 is a plan view illustrating an external view of an operation panel of the image communication apparatus according to the above-described embodiment.

FIG. 3 is a plan view illustrating an external view of an operation panel of the image communication apparatus according to the above-described embodiment. An operation panel 300 is provided with an LCD 301 as the display apparatus 115 in the center. The operation panel 300 further includes, as the input apparatus 116, as arranged from right to left; a start button 302 that starts a transmission and reception; a stop button 303 that stops phone communication, registration operations, etc.; a dial key 304 that inputs numbers such as phone numbers, facsimile numbers, etc.; a navigation key 305 that includes up/down and right/left scroll keys for scrolling information displayed on the LCD 301 and for moving a cursor; a mode select button 306 that selects various modes for copier, FAX, e-mail transmission/ reception (via internet), and printer; and a multifunctional input panel 307 that has multiple uses for the one-touch keys, program keys, and character input keys. A set key 308 is also provided above the stop button 303.

FIG. 4 is a plan view illustrating the multifunctional input panel of the image communication apparatus according to the above-described embodiment. First, the multifunctional input panel 307 can be used for the one-touch keys. In other words, the one-touch keys (keys with numbers 1–20 in the multifunctional input panel 307) are stored in association with destinations (such as phone numbers, FAX numbers, and e-mail addresses), in the one-touch key registration area 202 in the flash memory 113, and when a one-touch key is pressed, the corresponding destination can be read.

Second, the program keys (keys with numbers P1–P5) in the multifunctional input panel 307 are stored in association with various communication operation processes, such as memory transmission to frequently used destinations, and when one of the program keys is pressed, the corresponding process is automatically executed.

Third, the multifunctional input panel 307 is used for inputting characters and symbols. In other words, by using the keys assigned for alphabets, A–Z, the multifunctional input panel 307 can be used for inputting characters (these keys are called character input keys 401), and by using the key assigned for an @ mark, the multifunctional input panel 307 can be used for inputting an @ mark (this key is called an @ mark input key 402). Further, the multifunctional input panel 307 contains keys 403 and 404 that are assigned for spaces and symbols.

The dial key 304 that inputs phone numbers, or the like, can also be used for inputting characters. The image communication apparatus 100 is provided with a speed dial (destination input) function. In other words, predetermined short numeric strings, such as 001 and 002, are associated with destinations (such as phone numbers, facsimile numbers, and e-mail addresses), and they are registered in the speed dial registration area 201 in the flash memory 113, so that the corresponding destination can be retrieved when a short numeric string is input through the dial key 304.

The LCD 301 provided on the operation panel 300 has two display level, each with 20 character limit. Under the control of the panel controller 114, numbers, characters, symbols, and destinations, etc., which are input from the dial key 304 and multifunctional input panel 307, are displayed.

Figure 5:
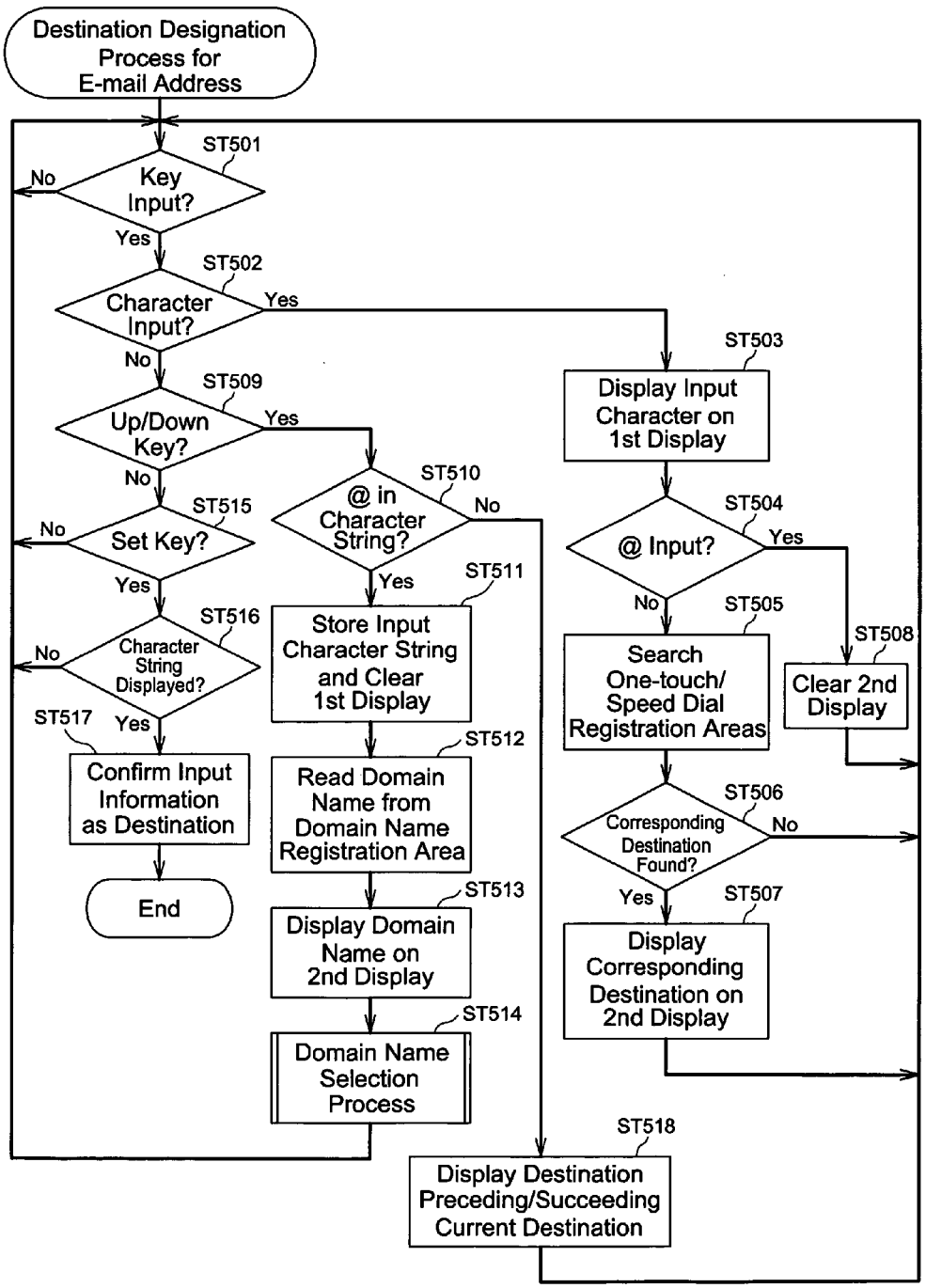
FIG. 5 is a flowchart illustrating an operation for a destination designation process for an e-mail address performed by the image communication apparatus according to the above-described embodiment.

Next, operations performed by the image communication apparatus having the above-described configuration, according to the present embodiment, are explained. FIG. 5 is a flowchart illustrating an operation for a destination designation process for an e-mail address performed by the image communication apparatus according to the present embodiment.

The panel controller 114 waits for a key input (step: ST501). If there is a key input, whether it is a character input is checked (ST502). If it is a character input, the input character is displayed on the first display 301a of the LCD 301 (ST503). Then, whether it is an @ mark is checked (ST504). If the answer is "NO", by using the input character string (at least one character), the one-touch key registration area 202 and the speed dial registration area 201 is searched (ST505). Searching is performed by matching the beginning of the string. In other words, an e-mail address that has the same character string with the input character string at the beginning, is searched for. The search method is not limited to the above; however, it is preferable to search for the destination that contains the same order of characters with the input information.

After the search, whether there is a corresponding destination is checked (ST506). If there is a corresponding destination, it is displayed on the second display 301b of the LCD 301 (ST507). If there are multiple destinations that correspond to the input character string, they are displayed one by one, and the operator can scroll the display in order by using the up/down keys of the navigation key 305.

On the other hand, if the input at ST504 is an @ mark, the display of the second display 301b is cleared (ST508), and the process returns to ST501.

If the input at ST502 is not a character input, whether it is an up/down key input from the navigation key 305 is checked (ST509). If the answer is "YES", whether there is an @ mark in the input character string (input information) is checked (ST510). If the answer is "NO", in order to display other corresponding destinations from the search at ST505, the display information of the second display 301b is switched to a destination immediately preceding or succeeding the current destination (ST518). If the answer is "YES", the character string (input information) that is already input is temporarily stored in the DRAM 103, and the display information of the first display 301a of the LCD 301 is cleared (ST511). Next, the domain name that is pre-registered is read from the domain name registration area 203 (ST512). If there are more than one domain names registered, they can be read from the beginning or end in alphabetical order, in random order, or the order of most frequently used. Thus, the reading order is not restricted to one. Then, the read domain name is displayed in the second display 301b of the LCD 301 (ST513). After that, the domain name selection process is performed (ST514), which will be described later. After the domain name selection process, the process returns to ST501.

If the key input is neither a character input (ST 502) nor an up/down key input (ST 509), whether it is a set key input is checked (ST 515). The set key input is performed by pressing the set key 308, which is provided on the operation panel 300. If the answer is "NO", the process returns to ST 501. If the answer is "YES", whether a character sting is displayed on the first display 301a of the LCD 301 is checked (ST 516). If the answer is "NO", the process returns to ST 501. If the answer is "YES", the character string (input information) is confirmed as a destination (ST 517) and sent to the network controller 106, and the process is completed.

Figure 6:
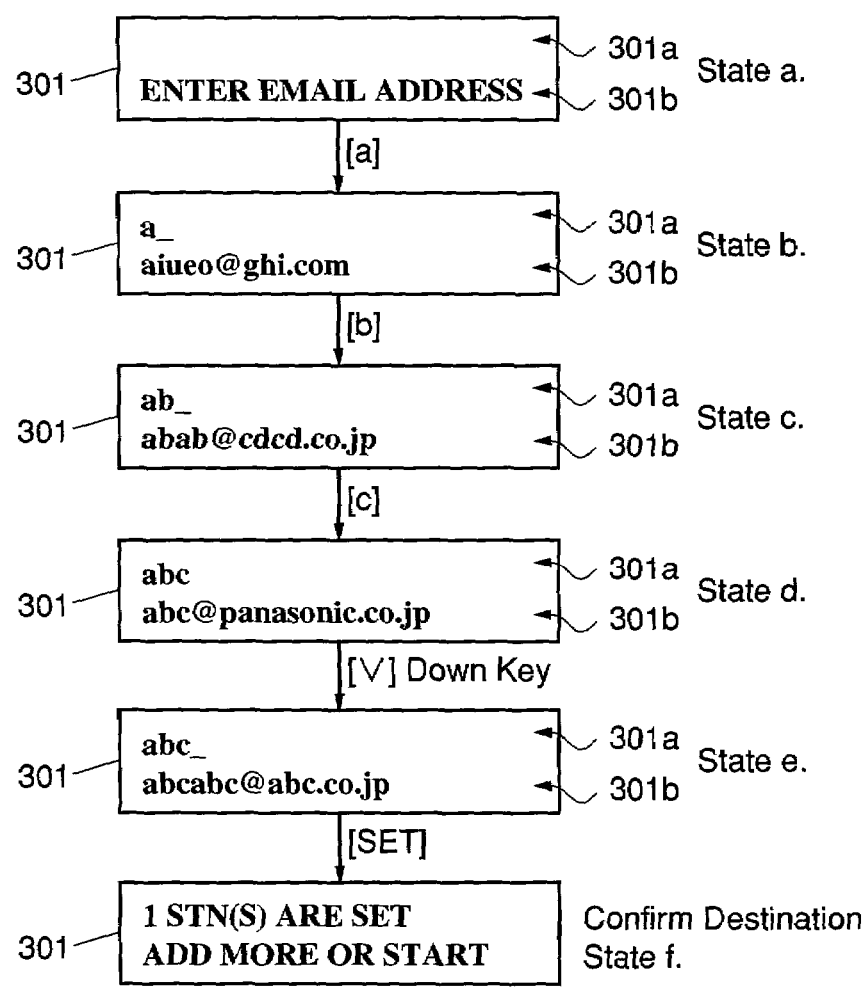
FIG. 6 shows an example of a display during the destination designation process for an e-mail address performed by the image communication apparatus according to the above-described embodiment.

An example of the LCD 301 displayed according to the process in FIG. 5 is explained. FIG. 6 is an example of a display during the destination designation process for an e-mail address performed by the image communication apparatus according to the above-described embodiment. Starting from the initial screen, as shown in FIG. 6; State a., when a character (e.g., "a") is input using the character input keys 401, the input character is shown in the first display 301a, as shown in FIG. 6; State b., and a corresponding destination (e-mail address) retrieved by the search using the single character is displayed on the second display 301b. Further, if another character (e.g., "b") is input using the character input keys 401, as shown in FIG. 6; State c., the input character string (input information) ("ab") is displayed in the order of the input on the first display 301a, and a corresponding destination retrieved by the search using the character string (input information), "ab", is displayed on the second display 301b. Likewise, if another character (e.g., "c") is input, as shown in FIG. 6; State d., the input information and the search result are displayed on the first display 301a and the second display 301b of the LCD 301, respectively. If the down key of the navigation key 305 is pressed, as shown in FIG. 6; State e., a corresponding destination immediately succeeding the current destination is displayed on the second display 301b. When the set key is input, as shown in FIG. 6; State f., the e-mail address displayed on the second display 301b is confirmed as a destination, and a message indicating the confirmation is displayed.

As explained above, after a character is input from the character input keys 401, the panel controller 114 displays, as shown in FIG. 6; States b.–d., the input information in its order on the first display 301a, searches for registered addresses (e-mail addresses) in the one-touch key registered area 202 and the speed dial registration area 201 using the input information as search keys, and displays the search result on the second display 301b. Therefore, the time to input an entire e-mail address is saved, the input of a user name of an e-mail address is simplified, and inputting errors are prevented.

Further, as shown in FIG. 6; States b.–d., the number of the corresponding destinations decreases as the number of the input characters from the character input keys 401 increases. Therefore, when an e-mail address as a destination is input, it is possible to gradually narrow down the number of the displayed addresses, from hundreds of destinations registered in the one-touch key registration area 202 and speed dial registration area 201. Accordingly, input of the destination becomes efficient.

The panel controller 114 displays the input information on the first display 301a and the search result on the second display 301b, which is located immediately below the first display 301a, at the same time. By simultaneously displaying the input information and the search result, the operator can compare both displays with each other to check whether the input information corresponds with the search result. Thus, it is possible to utilize the display space, even for a display section with limited space, and to input user names efficiently.

The LCD 301 in the present embodiment has two levels; however, the LCD 301 can have more levels, e.g., three and four levels. In case of three or more levels, by displaying the character string on one of the display levels, and by displaying the search results in the immediate upper/lower level, it is possible to achieve the same effect as that of the above-described embodiment.

The one-touch key registration area 202 and the speed dial registration area 201 are searched using the input information. By searching for a designation that corresponds with the input information from the destinations (e-mail addresses) registered for the one-touch keys and the speed dial, and by displaying the search result on the LCD 301, there is a high chance to obtain a search result that corresponds with the desired destination, and it is possible to input e-mail addresses efficiently using the pre-registered information, since there are hundreds of destinations at maximum registered for the one-touch keys and the speed dial.

Figure 7:
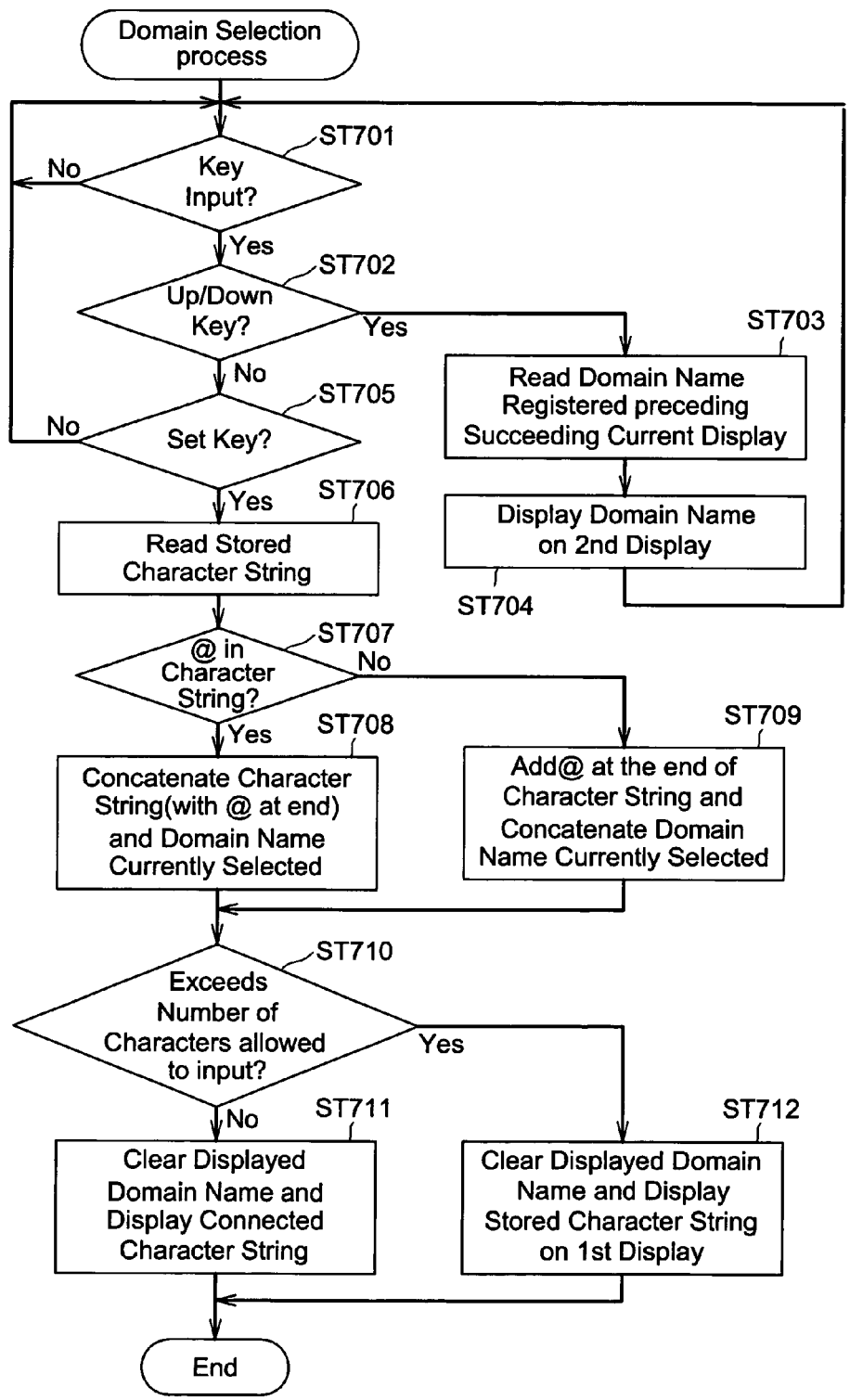
FIG. 7 is a flowchart illustrating an operation for a domain name selection process performed by the image communication apparatus according to the above-described embodiment.

Next, the domain name selection process is explained. FIG. 7 is a flowchart illustrating an operation for a domain selection process performed by the image communication apparatus according to the above-described embodiment.

During the domain selection process, if there is a key input (ST701), the panel controller 114 checks whether the key input is an up/down key input by the navigation key 305 (ST702). If the answer is "YES", a domain name that is registered preceding (if the up key is used) or succeeding (if the down key is used) the currently displayed domain name, is read from the domain name registration area 203 (ST703) and displayed on the second display 301b (ST704). After displaying the domain name, the process returns to ST701.

If the key input at ST702 is not an up/down key input, whether it is a set key input is checked (ST705). If the answer is "NO", the process returns to ST701. If the answer is "YES", the character string (input information) that is stored at ST511 of FIG. 5 is read (ST706), and whether there is an @ mark in the character string is checked (ST707). If the answer is "YES", the character string (including the @ mark at the end) and the domain name currently selected (currently displayed) are concatenated so as to obtain an e-mail address (ST708). If the answer is "NO", an @ mark is added at the end of the character string and concatenated with the domain name currently selected, so as to obtain an e-mail address (ST709). However, in the present embodiment, the domain name is selected by an @ mark input. Thus, it is not necessary to move to the process of ST709. During the one-touch/speed dial registration process, described later in FIGS. 9 and 10, this domain name selection process of FIG. 7 is also used, for the purpose of sharing software, and the process of ST709 is performed.

Whether the e-mail address concatenated at ST708 or ST709 exceeds the number of characters that is allowed to input (ST710) is checked. If it does not exceed, the domain name displayed on the LCD 301 is cleared and the concatenated e-mail address is displayed (ST711). If it exceeds the number, on the other hand, the domain name displayed on the LCD 301 is cleared, the stored character string is read again, and only the character string is displayed on the LCD 301 (ST712). In the present embodiment, in both of the one-touch registration area and the speed dial registration area of the FROM 113, the number of characters that can be registered per destination corresponds to the number of the character that can be input. Therefore, if the concatenated character string and the domain name exceed the number of the characters that is allowed to input, the number of characters that can be registered per destination is exceeding at the same time. Therefore, to re-input the e-mail address, the display returns to the state that displays the character string before selecting the domain name.

Figure 8:
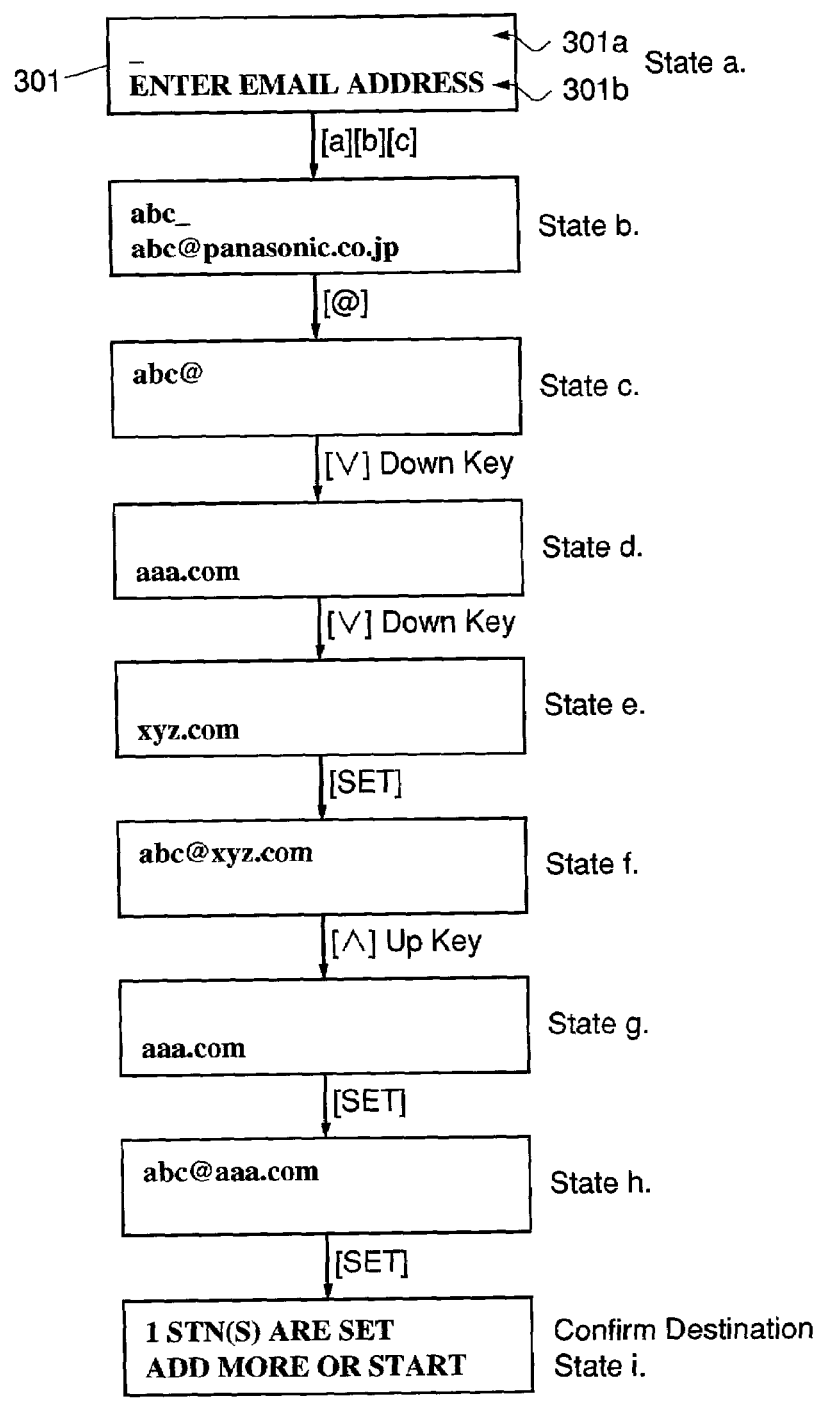
FIG. 8 is an example of a display during the domain name selection process for an e-mail address performed by the image communication apparatus according to the above-described embodiment.

An example of the LCD 301 displayed according to the process in FIG. 7 is explained. FIG. 8 is an example of a display during the domain name selection process for an e-mail address performed by the image communication apparatus according to the above-described embodiment.

Starting from the initial screen as shown in FIG. 8; State a., when characters are input (e.g., "abc") using the character input keys 401, the input character string (input information) is displayed on the first display 301*a*, as shown in FIG. 8; State b., and the corresponding destination (e-mail address) retrieved by the search using the character string is displayed on the second display 301*b*. Further, when an @ mark is input using the @ mark input key 402, the display information on the second display 301*b* will be cleared, as shown in FIG. 8; State c. Next, when the down key of the navigation key 305 is pressed, the domain name registered in the domain name registration area 203 is read. And, as shown in FIG. 8; State d., after clearing the other display information (i.e., the input information displayed on the first display 301*a*), the domain name will be displayed on the second display 301*b*.

In this situation, when the down key of the navigation key 305 is pressed, a domain name succeeding the currently displayed domain name will be read from the domain name registration area 203 and displayed, as shown in FIG. 8; State e. If a set key is input, the domain name currently displayed will be selected, the selected domain name will be concatenated with the character string (user name +@ mark) that is already input, and the concatenated e-mail address will be displayed on the first display 301*a*, as shown in FIG. 8; State f. In this situation, if the up key of the navigation key 305 is pressed again, as shown in FIG. 8; State g., the display information on the first display 301*a* is cleared, and a domain name preceding the currently selected domain name is read from the domain name registration area 203, and displayed on the second display 301*b*. If the set key is input, the domain name currently displayed is selected, the domain name is concatenated with the pre-input character string (user name+@ mark), and the concatenated e-mail address is displayed on the first display 301*a*, as shown in FIG. 8; State h. If the set key is input again, the e-mail address currently displayed on the first display 301*a* is confirmed as a destination, as shown in FIG. 8; State i.

Likewise, after the character string is input from the character input keys 401, if an @ mark is input from the @ mark input key 402, as shown in FIG. 8; State c., the display information of the second display 301*b* is switched to the domain name read from the domain name registration area 203. In other words, the reading source of the display information on the second display is switched from the one-touch key registration area 202 and speed dial registration area 201 to the domain name registration area 203. Thus, the @ mark input key 402, which is always used to input e-mail addresses, is utilized, in stead of using other keys, to switch the display information (reading source), and it is possible to conduct the transition from the input of user names to the selection of domain names smoothly.

Further, when the desired destination is not found in the destinations pre-registered in the one-touch key registration area 202 and the speed dial registration area 201, by inputting an @ mark pressing the @ mark input key 402, the display information for selecting destination switches from the search results to the pre-registered domain names. Therefore, when inputting an e-mail address, it is possible to gradually narrow down the destinations to be selected, and to designate a destination efficiently.

Further, as shown in FIG. 8; States e.–f., after the domain name is confirmed by the set key input, if the up/down key of the navigation key 305 is pressed, a domain name read from the domain name registration area 203 is displayed again on the second display 301*b*. Thus, even after selecting/confirming a domain name, a domain name selection can be restarted, and there is no need to restart the whole process in case the domain name selection is incorrect. As a result, the inconvenience of re-inputting an e-mail address can be prevented.

Also, as shown in FIG. 8; States d.–e., when an @ mark is input from the @ mark input key 402 to switch the display information of the LCD 301, other display information is cleared, and the domain name is displayed. Thus, even if the user name input from the character input keys 401 is long and extending from the first display 301*a* to the second display 301*b*, domain name will not follow the user name. Therefore, the operator's inconvenience to check where the domain name is starting form within the display information, for selecting a domain name, can prevented, and it is possible to input an e-mail address efficiently.

Also, after inputting a character string, or the like, and selecting a domain name, as shown in ST708 and ST709 of FIG. 7, the input information and the domain name are concatenated and displayed, as shown in FIG. 8; State f. Thus, since the user name and the domain name that were originally selected separately are finally concatenated, it is possible to input various combinations of e-mails efficiently.

Figure 9:
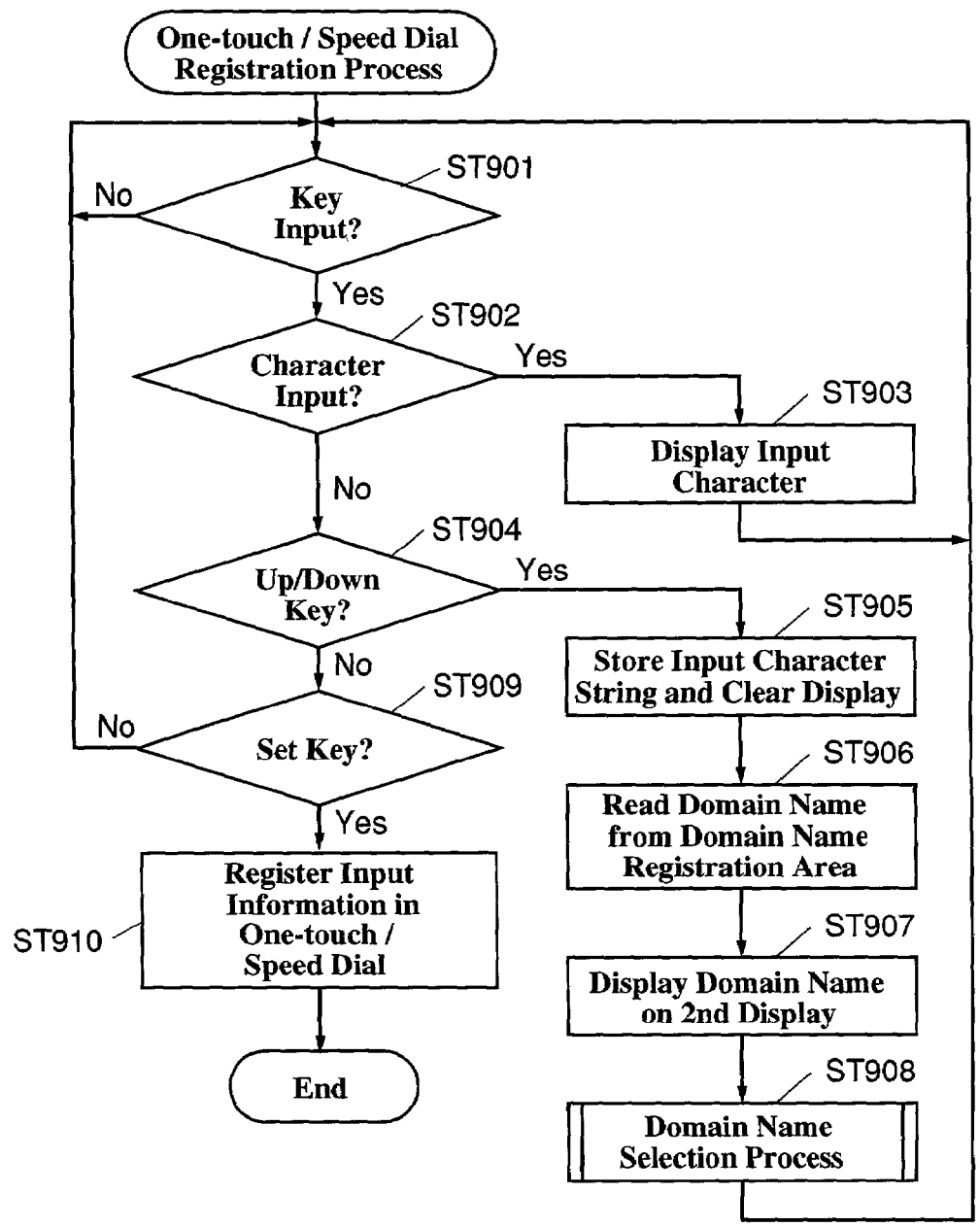
FIG. 9 is a flowchart illustrating an operation for a one-touch/speed dial registration process performed by the image communication apparatus according to the above-described embodiment.

Next, the one-touch/speed dial registration process is explained. FIG. 9 is a flowchart illustrating an operation for a one-touch/speed dial registration process performed by the image communication apparatus according to the above-described embodiment.

During the one-touch/speed dial registration process, when there is a key input (ST901), the panel controller 114 checks whether the key input is a character input (ST902). If the answer is "YES", the input character is displayed on the first display 301*a* (ST903), and the process returns to ST901. If the answer is "NO", on the other hand, whether the key input is from the up/down key of the navigation key 305 is checked (ST904). If the answer is "YES", the character string (input information) that is already input is temporarily stored in the DRAM 103, and the display on the first display 301*a* of the LCD 301 is cleared (ST905). Next, the pre-registered domain name is read from the domain name registration area 203 (ST906). Then, the read domain name is displayed on the second display 301*b* of the LCD 301 (ST907). Subsequently, the domain name selection process is performed (ST908). After the domain name selection process is finished, the process returns to ST901.

If the key input is neither a character input (ST902) nor an up/down key input (ST904), whether the key input is a set key input is checked (ST909). If the answer is "NO", the process returns to ST901. If the answer is "YES", the character string (input information) is registered in the one-touch key registration area 202 or the speed dial registration area 201, in association with a specific key or a speed dial string (ST910), and the process will be finished.

Figure 10:
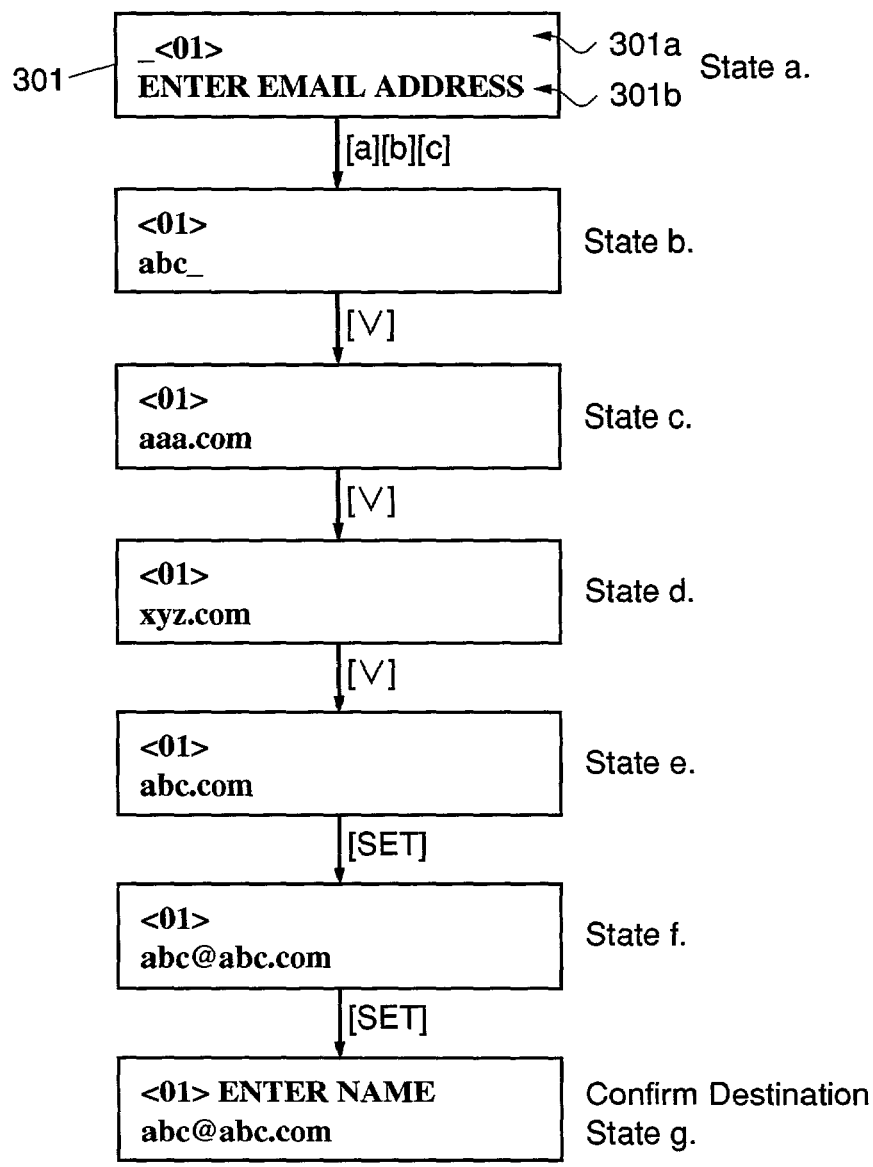
FIG. 10 is an example of a display during the domain name selection process for an e-mail address of one-touch/speed dial registration process performed by the image communication apparatus according to the above-described embodiment.

An example of the LCD 301 displayed according to the process shown in FIG. 9, is explained. FIG. 10 is an example of a display during the domain name selection process for an e-mail of the one-touch/speed dial registration process performed by the image communication apparatus according to the above-described embodiment.

Using FIG. 10, a situation for registering e-mail addresses in one-touch key "01" is illustrated. In FIG. 8, an example with an @ mark before selecting a domain name was shown, however, in FIG. 9, an example without an @ mark input will be demonstrated.

Starting from an initial screen as shown in FIG. 10; State a., when characters are input (e.g., "abc") using the character input keys 401, the input character string (input information) will be displayed on the second display 301b, as shown in FIG. 10; State b. When the down key of the navigation key 305 is pressed, the domain name registered in the domain name registration area 203 is read, and the read domain name is displayed after clearing the other display information (input information displayed on the second display 301b), as shown in FIG. 10; State c.

If the down key of the navigation key 305 is pressed in this situation, a domain name succeeding the currently displayed domain name will be read from the domain name registration area 203, and displayed, as shown in FIG. 10; States d.–e.

After the set key 308 is input, the currently displayed domain name is selected, the pre-input character string (user name only) is concatenated with the domain name by automatically inserting an @ mark in between, and the concatenated e-mail address is displayed on the second display 301b, as shown in FIG. 10; State f. If the set key 308 is input again, the currently displayed e-mail address on the second display 301b is confirmed as a destination, as shown in FIG. 10; State g., and registered in the one-touch key registration area 202.

Likewise, for registering destinations (e-mail addresses) in the one-touch key registration area 202 and the speed dial registration area 201, the panel controller 114 first displays the input information from the character input keys 401 on the second display 301b, as shown in FIG. 10; State b., and secondly read the pre-registered domain name from the domain name registration area 203, to display the same on the second display 301b, as shown in FIG. 10; States c.–e. If the desired domain name is selected, whether there is an @ mark in the input information is checked in ST707 of FIG. 7. If there is, the input information (user name +@) of ST708 and the desired domain name is concatenated, and the concatenated e-mail address is registered in the one-touch key registration area 202 or the speed dial registration area 201 in ST710. If there is not, the input information of ST709 (user name only) and the desired domain name is concatenated by automatically inserting an @ mark in between, and the concatenated e-mail address is registered in the one-touch key registration area 202 or the speed dial registration area 201 in ST710. Thus, the operator does not have to check whether an @ mark is input, when selecting a domain name, but can concentrate on selecting a domain name. Therefore, it is possible to register an e-mail address effectively and to prevent input errors.

The present invention is not limited to the above described embodiments, and various variations and modifications may be possible without departing from the scope of the present invention. In the present embodiment, an image communication apparatus was used as an example; however, the present invention can be applied to various data communication apparatus that transmit data via internet to input e-mail addresses, such as mobile phones and mobile information terminals.

This application is based on the Japanese Patent Application No. 2001-055007 filed on Feb. 28, 2001, entire content of which is expressly incorporated by reference herein.

What is claimed is:

1. A data communication apparatus, comprising:
   a memory configured to store a plurality of domain names associated with e-mail addresses;
   a panel configured to input at least one character of a user name of an e-mail address and an @ mark, and to select one domain name from the plurality of the domain names stored in the memory;
   a display configured to display data; and
   a controller configured to:
   control the display to display the at least one character of the user name of the e-mail address input by the panel;
   determine whether the @ mark is input by the panel when the at least one character of the user name of the e-mail address is displayed;
   determine whether the panel has been operated to select one domain name from the plurality of the domain names stored in the memory;
   clear the at least one character displayed on the display, when the @ mark is input by the panel and when the panel has been operated to select the domain name from the plurality of the domain names stored in the memory;
   control the display to display a domain name from the plurality of the domain names stored in the memory without inputting, by the panel, of a character after the @ mark, when the @ mark is determined to be input by the panel and when it is determined that the panel has been operated to select the domain name from the plurality of the domain names stored in the memory;
   display the selected domain name without displaying the character input by the panel before the @ mark is input by the panel;
   generate the e-mail address, based on the at least one character of the user name of the e-mail address input by the panel, the @ mark input by the panel, and the displayed domain name, when the displayed domain name is selected by the panel; and
   transmit an e-mail to a destination, based on the generated e-mail address.

2. A data communication apparatus, comprising:
   a memory configured to store a plurality of domain names associated with e-mail addresses;
   a panel comprising a set key and being configured to input at least one character of a user name of an e-mail address and an @ mark, and to select one domain name from the plurality of the domain names stored in the memory;
   a display configured to display data; and
   a controller configured to:
   control the display to display the at least one character of the user name of the e-mail address input by the panel;

determine whether the @ mark is input by the panel when the at least one character of the user name of the e-mail address is displayed;

determine whether the panel has been operated to select one domain name from the plurality of the domain names stored in the memory;

control the display to display a domain name from the plurality of the domain names stored in the memory without inputting, by the panel, of a character after the @ mark, when the @ mark is determined to be input by the panel and when it is determined that the panel has been operated to select the domain name from the plurality of the domain names stored in the memory;

select, upon operation of the set key, the displayed domain name;

control the display to display another domain name from the plurality of the domain names stored in the memory, when the panel is operated to select the another domain name after the displayed domain name is selected by the set key;

generate the e-mail address, based on the at least one character of the user name of the e-mail address input by the panel, the @ mark input by the panel, and the displayed another domain name, when the displayed another domain name is selected by the panel; and transmit an e-mail to a destination, based on the generated e-mail address.

3. A data communication apparatus, comprising:

a memory configured to store a plurality of domain names associated with e-mail addresses;

a panel configured to input at least one character of a user name of an e-mail address and an @ mark, and to select one domain name from the plurality of the domain names stored in the memory;

a display comprising a first display section and a second display section and being configured to display data; and a controller configured to:

control the display to display the at least one character of the user name of the e-mail address input by the panel;

determine whether the @ mark is input by the panel when the at least one character of the user name of the e-mail address is displayed;

determine whether the panel has been operated to select one domain name from the plurality of the domain names stored in the memory;

control the display to display a domain name from the plurality of the domain names stored in the memory without inputting, by the panel, of a character after the @ mark, when the @ mark is determined to be input by the panel and when it is determined that the panel has been operated to select the domain name from the plurality of the domain names stored in the memory;

control the display to display, at the first display section, the at least one character of the user name of the email address input by the panel, and to display, at the second display section, the one domain name obtained from the plurality of the domain names stored in the memory;

generate the e-mail address, based on the at least one character of the user name of the e-mail address input by the panel, the @ mark input by the panel, and the displayed domain name, when the displayed domain name is selected by the panel; and transmit an e-mail to a destination, based on the generated e-mail address.

4. The data communication apparatus according to claim 3, wherein the first display section and the second display section are arranged in parallel.

5. A data communication apparatus, comprising:

a first memory configured to store a plurality of e-mail addresses, each of the plurality of the e-mail addresses including a domain name;

a second memory configured to store a plurality of domain names associated with the e-mail addresses;

a panel configured to input at least one character of a user name of an e-mail address and an @ mark, and to select one domain name from the plurality of the domain names stored in the second memory;

a display configured to display data; and a controller configured to:

control the display to display the at least one character of the user name of the e-mail address input by the panel;

control the display to display one e-mail address from the plurality of the e-mail addresses stored in the first memory, the one e-mail address including the at least one character input by the panel, when the at least one character of the user name of the e-mail is displayed;

determine whether the @ mark is input by the panel;

clear the one e-mail address displayed on the display, when the @ mark is input by the panel;

determine whether the panel has been operated to select one domain name from the plurality of the domain names stored in the second memory;

control the display to display a domain name from the plurality of the domain names stored in the second memory without inputting, by the panel, of a character after the @ mark, when the @ mark is determined to be input by the panel and when it is determined that the panel has been operated to select the domain name from the plurality of the domain names stored in the second memory;

generate the e-mail address, based on the at least one character of the user name of the e-mail address input by the panel, the @ mark input by the panel, and the displayed domain name, when the displayed domain name is selected by the panel; and transmit an e-mail to a destination, based on the generated e-mail address.

6. The data communication apparatus according to claim 5, wherein the panel comprises a one-touch key, the one-touch key corresponding to an e-mail address stored in the first memory, and the controller obtains, from the first memory, the e-mail address corresponding to the one-touch key and controls the display to display the corresponding e-mail address, when the one-touch key is selected.

7. The data communication apparatus according to claim 5, the panel further including a speed dial function, wherein in the speed dial function a predetermined combination of characters corresponding to an e-mail address is stored in the first memory, and the controller obtains, from the first memory, the e-mail address corresponding to the predetermined combination of characters and controls the display to display the corresponding e-mail address, when the predetermined combination of characters is selected.

* * * * *